(12) United States Patent
Lopez et al.

(10) Patent No.: US 8,586,657 B2
(45) Date of Patent: Nov. 19, 2013

(54) AQUEOUS FIRE-RETARDANT NON-CORROSIVE COMPOSITION FOR TOPICAL APPLICATION TO PRODUCTS AND ARTICLES

(76) Inventors: Richard A. Lopez, Dana Point, CA (US); Bertine Pinckney, San Juan Capistrano, CA (US)

( * ) Notice: Subject to any disclaimer, the term of this patent is extended or adjusted under 35 U.S.C. 154(b) by 0 days.

(21) Appl. No.: 13/338,239

(22) Filed: Dec. 27, 2011

(65) Prior Publication Data

US 2012/0148754 A1 Jun. 14, 2012

Related U.S. Application Data

(63) Continuation-in-part of application No. 12/500,044, filed on Jul. 9, 2009, now Pat. No. 8,084,523, and a continuation-in-part of application No. 11/858,427, filed on Sep. 20, 2007, now abandoned.

(60) Provisional application No. 60/846,712, filed on Sep. 22, 2006.

(51) Int. Cl.
*C08K 5/21* (2006.01)

(52) U.S. Cl.
USPC ............ 524/211; 524/387; 524/406; 524/416

(58) Field of Classification Search
USPC .................................. 524/211, 387, 405, 416
See application file for complete search history.

(56) References Cited

U.S. PATENT DOCUMENTS

| | | | |
|---|---|---|---|
| 2004/0121114 A1* | 6/2004 | Piana et al. | 428/85 |
| 2006/0084738 A1* | 4/2006 | Lopez et al. | 524/404 |
| 2007/0224289 A1* | 9/2007 | Clausen et al. | 424/641 |
| 2007/0224395 A1* | 9/2007 | Rowitsch et al. | 428/143 |

* cited by examiner

*Primary Examiner* — Peter Szekely
(74) *Attorney, Agent, or Firm* — Kafantaris Law Offices; Theo Kafantaris

(57) ABSTRACT

Disclosed is a fire-retardant, non-corrosive, insect-resistant, fungus-resistant composition comprising a first flame-retardant agent, a preservative composition, a second flame-retardant agent, a third flame-retardant agent, and a liquid melamine formaldehyde resin adhesive. The composition is to be used for topical application to articles using a spray device, where a layer of a desired thickness is applied.

16 Claims, 1 Drawing Sheet

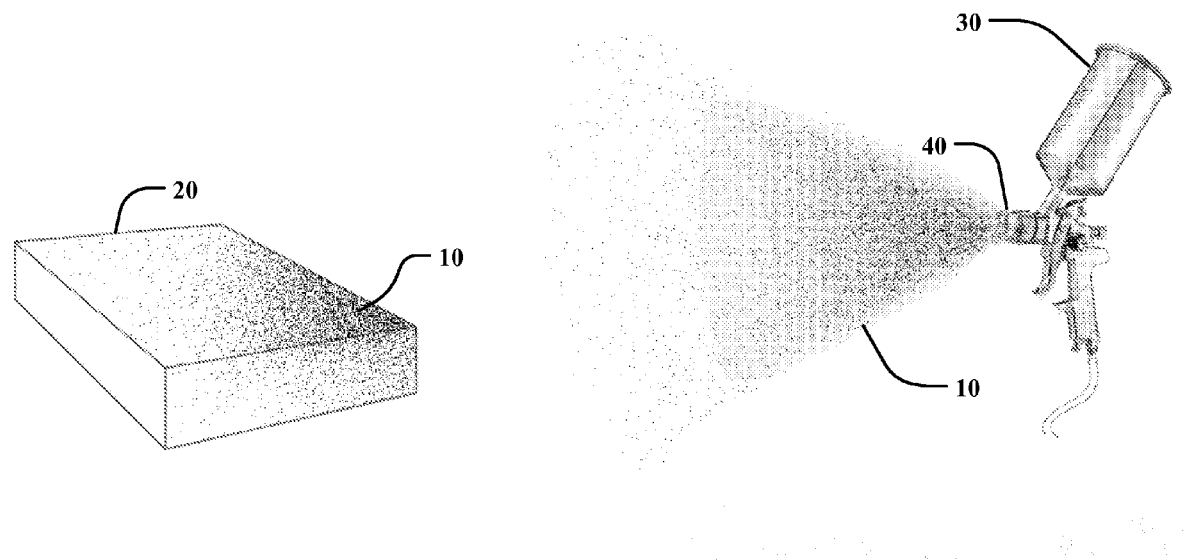

AQUEOUS FIRE-RETARDANT NON-CORROSIVE COMPOSITION FOR TOPICAL APPLICATION TO PRODUCTS AND ARTICLES

CROSS-REFERENCE TO RELATED APPLICATIONS

This application is a continuation application and is based on and claims priority to Continuation-In-Part patent application Ser. No. 12/500,044, now U.S. Pat. No. 8,084,523, filed Jul. 9, 2009, Continuation-In-Part patent application Ser. No. 11/858,427, filed Sep. 20, 2007 now abandoned, U.S. Provisional Patent Application Ser. No. 60/846,712, filed Sep. 22, 2006, the entirety of which is incorporated herein by reference; and U.S. patent application Ser. No. 11/671,761, filed Feb. 6, 2007, the entirety of which is herein incorporated by reference.

STATEMENT REGARDING FEDERALLY SPONSORED RESEARCH AND DEVELOPMENT

Not Applicable.

FIELD OF THE INVENTION

This invention relates generally to fire-retardant compositions, and more particularly, to an aqueous, fire-retardant, non-corrosive composition to be used for topical application to products and articles.

DISCUSSION OF RELATED ART

The flame-retardant material is any appropriate substance that is applied to a combustible material to suppress fire or flame. Flame-retardants function by reducing the burn rate of the target material. There are two types of flame retardants. The first are most effective with materials that have a substantial amount of amount of oxygen, such as cellulose and other synthetic polymers. These flame retardants include phosphoric or sulfuric acid, which are neutralized by simple organic substances that vaporize the onset of fire. The second are most effective with materials having carbon-based polymers, such as polyethylene or polyvinyl chloride. These flame retardants decompose in the fire, intervening with the burning process.

Wood and steel buildings must pass performance-based fire tests that strictly comply with approved fire and quality control testing procedures. Laboratory fire tests are conducted on the fire-retardant materials to ensure they contain the appropriate fire-resistive properties. Quantitative and visual evaluation is also considered during the fire test procedure, determining the degree and value of an assigned fire retardant classification.

While several flame-retardant compositions exist, they do not offer a simple application method while maintaining superior flame-retardant properties. Therefore, a need exists for a flame-retardant composition which maintains superior flame-retardant properties and can be topically applied to a target product or article using a spray device. The present invention accomplishes these objectives.

SUMMARY OF THE INVENTION

The present device incorporates various chemical constituents comprising a homogenized, pre-blended combination of fire-retardant ingredients and preservative gradients of non-corrosive materials for imparting resistance to flame, insect permeation, fungus, mold, and wood-rot to a target product or article. The present invention is an all-encompassing fire-resistance and wood preservative composition.

The present invention comprises an aqueous, non-corrosive, fire-retardant, insect-resistant, and fungus-resistant composition comprising a first flame-retardant agent, a preservative composition, a second flame-retardant agent, a third flame-retardant agent, and a liquid melamine formaldehyde resin adhesive. This composition is used for topical application to products and articles.

A method of topically applying this composition includes receiving an article on which the fire-retardant, insect-resistant, and fungus-resistant layer is to be applied, preparing a spraying device to apply to the article the composition, and spraying the composition onto the article, creating a layer of desired thickness. A thickness range between 0.1 to 0.5 grams per square inch is desirable, although any thickness can be applied. Due to its non-corrosive properties, the present invention will not corrode any form of metal and is perfectly suited for application to both.

The present invention will provide a flame-retardant composition which maintains superior flame-retardant properties and can be topically applied to a target product or article using a spray device. Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a spray device applying the flame-retardant composition to an article.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

The present invention is directed to an aqueous, non-corrosive, fire-retardant, insect-resistant, and fungus-resistant composition 10 comprising a first flame-retardant agent, a preservative composition, a second flame-retardant agent, a third flame-retardant agent, and a liquid melamine formaldehyde resin adhesive. This composition 10 is used for topical application to products and articles 20. A method of topically applying this composition 10 includes receiving an article 20 on which the fire-retardant, insect-resistant, and fungus-resistant layer is to be applied, preparing a spraying device 30 to apply to the article 20 the composition 10, and spraying the composition 10 onto the article 20, creating a layer of desired thickness. A thickness range between 0.1 to 0.5 grams per square inch is desirable, although any thickness can be applied.

The first flame-retardant agent is prepared by blending a melamine-formaldehyde resin, a urea-formaldehyde resin, urea, and diammonium phosphate in water. The weight ratio of the water to the melamine-formaldehyde resin ranges from approximately 8:1 to 12:1. The weight ratio of the water to the urea-formaldehyde resin ranges from approximately 10:1 to 15:1. The weight ratio of the water to the urea ranges from approximately 2:1 to 3:1. The weight ratio of the water to the diammonium phosphate ranges from approximately 5:1 to 10:1.

In the preferred embodiment, the first flame-retardant agent comprises approximately 55% (w/v) water, 7% (w/v) melamine-formaldehyde resin, 5% (w/v) urea-formaldehyde resin, 25% (w/v) urea, and 8% (w/v) diammonium phosphate. The two resins, urea, and diammonium phosphate all contain sources of nitrogen, with an overall nitrogen content of 15% (w/v). The first flame-retardant agent generally constitutes from about 25% to about 50% (w/v) of the total fire-retardant composition 10.

The preservative composition comprises disodium octaborate tetrahydrate. The preservative composition is characterized by a pH ranging from about 6-8 and a specific gravity of 0.97-1.00. An example of a suitable preservative composition includes, but is not limited to, BoraSol-WR™, manufactured by Quality Borate Co. of Cleveland, Ohio. The preservative composition included in the fire-retardant composition 10 in combination with the above described agents provides resistance to fungi and insects. The preservative composition generally constitutes from about 1% to about 50% (w/v) of the total fire-retardant composition 10. Additional water-soluble liquid wood preservatives may also be used.

The second flame-retardant agent comprises fine particle pentaerythritol and dipentaerythritol. The weight ratio of the pentaerythritol to the dipentaerythritol ranges from approximately 20:1 to 100:1. The second flame-retardant agent is characterized by a density of 370-390 kg/m$^3$, solubility in water of 62 g/l, and a pH ranging from about 4-7. An example of a suitable second flame-retardant agent includes, but is not limited to, Charmor® PM40, manufactured by Perstorp Polyols, Inc. of Toledo, Ohio. The second flame-retardant agent generally constitutes from about 15% to about 20% (w/v) of the total fire-retardant composition 10.

The third flame-retardant agent comprises insoluble fine particle ammonium polyphosphate. The third flame-retardant agent is characterized by a density of 1.9 g/cm$^3$, a nitrogen content of 14-15% (w/v), a phosphorus content of 31-32 (w/v), and a pH ranging from about 5.5-7.5. An example of a suitable third flame-retardant agent includes, but is not limited to, Exolilt AP 422, manufactured by Clariant Co. of New London, Conn. The third flame-retardant agent generally constitutes from about 15% to about 20% (w/v) of the total fire-retardant composition 10.

The liquid melamine formaldehyde resin adhesive comprises purified melamine with a purity above 99% and a water concentration of less than 0.2% by weight, melamine phosphate, and a free formaldehyde concentration of less than 0.5% by weight. The liquid melamine formaldehyde resin adhesive is characterized by a between 600-1000 cP, a pH ranging from about 8.0-10, and a specific gravity of about 1.24 Kg/liter. An example of a suitable liquid melamine formaldehyde resin adhesive includes, but is not limited to, MB-4650, manufactured by National Casein of Jersey City, N.J. The liquid melamine formaldehyde resin adhesive acts as a catalyst, polymerizing the composition 10. The liquid melamine formaldehyde resin adhesive generally constitutes from about 25% to about 35% (w/v) of the total fire-retardant composition 10.

Using the methodology described below, the indicated percent amounts of the blended constituents together form the aqueous, non-corrosive, fire-retardant, insect-resistant, and fungus-resistant composition 10. Relative proportions of the constituents can be adjusted to optimize results based upon the stipulated design factors and desired characteristics and qualities of the end-user.

A. To a mixing tank, add 31% (w/v) of the first flame-retardant agent.
B. Add about 4.5% (w/v) of the preservative composition 10.
C. Continue mixing with constant stirring until a smooth liquid mixture results.
D. Add 17% (w/v) of the second flame-retardant agent.
E. Continue mixing with constant stirring until a smooth liquid mixture results.
F. Add 17% (w/v) of the third flame-retardant agent.
G. Continue mixing with constant stirring until a smooth liquid mixture results.
H. Add 33% (w/v) of the liquid melamine formaldehyde resin adhesive.
I. Continue mixing with constant stirring until a smooth liquid mixture results.
J. Transfer blended fire-retardant adhesive composition 10 to holding tank and store until ready for use.

In the preferred embodiment, an automated high-pressure-spray device 30 dispenses a pre-determined amount of fire-retardant composition 10 to a product or article 20. The pre-determined amount of fire-retardant composition 10 is adjustable based upon performance parameters required by the end-user. A processor-implemented device is used to calculate and adjust the pre-determined amount of fire-retardant composition 10 to apply. An electronic scanner activates the spray gun system 30 and automatically applies a layer of a desired thickness to the product or article 20. A station of calibrated pre-heated spray devices 30 will then automatically disperse a specified amount of fire retardant through pre-heated nozzles 40, which upon contact with various wood products or articles 20 will dry quickly. In an alternative embodiment, the liquid melamine formaldehyde resin adhesive is excluded from the flame-retardant composition 10, and is instead applied using a separate nozzle 40 during the application phase. In a further alternative embodiment, each liquid constituent is excluded from the flame-retardant composition 10 and is instead applied using a separate nozzle 40 during the application phase.

In an alternative embodiment, the aqueous, non-corrosive, fire-retardant, insect-resistant, and fungus-resistant composition 10 comprises 30-40% (w/v) of a melamine-formaldehyde resin, 1-2% (w/v) of a urea-formaldehyde resin, 2-3% (w/v) of diammonium phosphate, 5-10% (w/v) of urea, 10-40% (w/v) of water, 15-20% (w/v) of pentaerythritol, 0-1% (w/v) of dipentaerythritol, and 15-20% (w/v) of ammonium polyphosphate.

The foregoing description of preferred embodiments of the subject application has been presented for purposes of illustration and description. It is not intended to be exhaustive or to limit the subject application to the precise form disclosed. Obvious modifications or variations are possible in light of the above teachings. The embodiments were chosen and described to provide the best illustration of the principles of the subject application and its practical application to thereby enable one of ordinary skill in the art to use the subject application in various embodiments and with various modifications as are suited to the particular use contemplated.

What is claimed is:

1. An aqueous, non-corrosive, fire-retardant, insect-resistant, and fungus-resistant composition comprising: a) a first flame-retardant agent; b) a preservative composition; c) a second flame-retardant agent; d) a third flame-retardant agent; and e) a liquid melamine formaldehyde resin adhesive, wherein the composition is used for topical application to articles and wherein second flame-retardant agent comprises pentaerythritol and dipentaerythritol with a weight ratio of pentaerythritol to dipentaerythritol ranging from approximately 20:1 to 100:1.

2. The aqueous fire-retardant composition of claim 1 wherein the first flame-retardant agent comprises melamine-formaldehyde resin, urea-formaldehyde resin, urea, diammonium phosphate, and water.

3. The aqueous fire-retardant composition of claim 2 wherein the weight ratio of the water to the melamine-formaldehyde resin ranges from approximately 8:1 to 12:1, wherein the weight ratio of the water to the urea-formaldehyde resin ranges from approximately 10:1 to 15:1, wherein the weight ratio of the water to the urea ranges from approximately 2:1 to 3:1, and wherein the weight ratio of the water to the diammonium phosephate ranges from approximately 5:1 to 10:1.

4. The aqueous fire-retardant composition of claim 1, wherein the preservative composition comprises disodium octaborate tetrahydrate.

5. The aqueous fire-retardant composition of claim 1 wherein the third flame-retardant agent comprises ammonium polyphosphate.

6. The aqueous fire-retardant composition of claim 1 wherein the liquid melamine formaldehyde resin adhesive comprises purified melamine with a water concentration of less than 0.2% by weight, melamine phosphate, and a free formaldehyde concentration of less than 0.5% by weight.

7. The aqueous fire-retardant composition of claim 1 wherein 25% to 50% by weight of a) is used, 1% to 50% by weight of b) is used, 15% to 20% by weight of c) is used, 15% to 20% by weight of d) is used, and 25% to 35% by weight of e) is used.

8. A method of topically applying an aqueous, non-corrosive, fire-retardant, insect-resistant, and fungus-resistant composition comprising the steps of: a) receiving an article for incorporation of a fire-retardant, insect-resistant, and fungus-resistant layer; b) preparing a spraying device with a composition comprising a first fire-retardant agent, a preservative composition, a second fire-retardant agent, a third fire-retardant agent, and a liquid melamine formaldehyde resin adhesive; and c) spraying said composition onto said article, creating a layer of a desired thickness and wherein second flame-retardant agent comprises pentaerythritol and dipentaerythritol with a weight ratio of pentaerythritol to dipentaerythritol ranging from approximately 20:1 to 100:1.

9. The aqueous fire-retardant composition of claim 8 wherein the desired thickness of said layer comprises spraying said composition onto said article in the range of 0.1-0.5 grams per square inch.

10. The aqueous fire-retardant composition of claim 8 wherein the first flame-retardant agent comprises melamine-formaldehyde resin, urea-formaldehyde resin, urea, diammonium phosphate, and water.

11. The aqueous fire-retardant composition of claim 10 wherein the weight ratio of the water to the melamine-formaldehyde resin ranges from approximately 8:1 to 12:1, wherein the weight ratio of the water to the urea-formaldehyde resin ranges from approximately 10:1 to 15:1, wherein the weight ratio of the water to the urea ranges from approximately 2:1 to 3:1, and wherein the weight ratio of the water to the diammonium phosphate ranges from approximately 5:1 to 10:1.

12. The aqueous fire-retardant composition of claim 8, wherein the preservative composition comprises disodium octaborate tetrahydrate.

13. The aqueous fire-retardant composition of claim 8 wherein the third flame-retardant agent comprises ammonium polyphosphate.

14. The aqueous fire-retardant composition of claim 8 wherein the liquid melamine formaldehyde resin adhesive comprises purified melamine with a water concentration of less than 0.2% by weight, melamine phosphate, and a free formaldehyde concentration of less than 0.5% by weight.

15. The aqueous fire-retardant composition of claim 8 wherein 25% to 50% by weight of a) is used, 1% to 50% by weight of b) is used, 15% to 20% by weight of c) is used, 15% to 20% by weight of d) is used, and 25% to 35% by weight of e) is used.

16. An aqueous, non-corrosive, fire-retardant, insect-resistant, and fungus-resistant composition comprising: a) 30-40% by weight of a melamine-formaldehyde resin; b) 1-2% by weight of a urea-formaldehyde resin; c) 2-3% by weight of diammonium phosphate; d) 5-10% by weight of urea; e) 10-40% by weight of water; f) 15-20% by weight of pentaerythritol; g) 0-1% by weight of dipentaerythritol; and h) 15-20% by weight of ammonium polyphosphate.

* * * * *